(12) United States Patent
Yoshida et al.

(10) Patent No.: US 11,203,065 B2
(45) Date of Patent: Dec. 21, 2021

(54) METHOD FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Norio Yoshida, Nara (JP); Akifumi Nakamura, Osaka (JP); Satoshi Abe, Osaka (JP); Masanori Morimoto, Osaka (JP); Yoshiyuki Uchinono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 980 days.

(21) Appl. No.: 15/748,329

(22) PCT Filed: Jul. 28, 2016

(86) PCT No.: PCT/JP2016/003510
§ 371 (c)(1),
(2) Date: Jan. 29, 2018

(87) PCT Pub. No.: WO2017/022226
PCT Pub. Date: Feb. 9, 2017

(65) Prior Publication Data
US 2018/0221952 A1    Aug. 9, 2018

(30) Foreign Application Priority Data
Jul. 31, 2015   (JP) .............................. JP2015-152061

(51) Int. Cl.
*B22F 3/105*  (2006.01)
*B22F 5/00*   (2006.01)
(Continued)

(52) U.S. Cl.
CPC .............. *B22F 10/20* (2021.01); *B33Y 10/00* (2014.12); *B22F 5/007* (2013.01); *B22F 2999/00* (2013.01); *B33Y 80/00* (2014.12)

(58) Field of Classification Search
None
See application file for complete search history.

(56) References Cited

U.S. PATENT DOCUMENTS

| 4,863,538 A | 9/1989 | Deckard |
| 5,985,204 A | 11/1999 | Otsuka et al. |
| (Continued) | | |

FOREIGN PATENT DOCUMENTS

| CN | 104401002 A | 3/2015 |
| DE | 199 53 000 | 4/2003 |
| (Continued) | | |

OTHER PUBLICATIONS

Chin SY, Dikshit V, Meera Priyadarshini B, Zhang Y. Powder-Based 3D Printing for the Fabrication of Device with Micro and Mesoscale Features. Micromachines. 2020; 11 (7):658. (Year: 2020).*

(Continued)

*Primary Examiner* — Anthony M Liang
(74) *Attorney, Agent, or Firm* — Greenblum & Bernstein, P.L.C.

(57) ABSTRACT

There is provided a more efficient method for manufacturing a three-dimensional shaped object. The method of the present invention comprises a successive formation of a plurality of solidified layers through a light beam irradiation, wherein the solidified layers are provided by a hybrid of combined systems of an after irradiation system and a simultaneous irradiation system, the after irradiation system being such that the light beam irradiation is performed after a formation (Continued)

of a powder layer, the simultaneous irradiation system being such that the light beam irradiation is performed while a raw material is supplied.

12 Claims, 11 Drawing Sheets

(51) Int. Cl.
*B33Y 10/00* (2015.01)
*B22F 10/20* (2021.01)
*B33Y 80/00* (2015.01)

(56) References Cited

U.S. PATENT DOCUMENTS

| | | | | |
|---|---|---|---|---|
| 2010/0238766 | A1* | 9/2010 | Penny | G10K 11/162 367/176 |
| 2014/0242400 | A1 | 8/2014 | Hoebel et al. | |

FOREIGN PATENT DOCUMENTS

| | | |
|---|---|---|
| EP | 2 119 530 | 11/2009 |
| JP | 1-502890 | 10/1989 |
| JP | 2000-73108 | 3/2000 |
| JP | 2002-38201 | 2/2002 |
| JP | 3943315 | 7/2007 |
| JP | 2015-85547 | 5/2015 |
| KR | 1998-0081687 | 11/1998 |
| KR | 2014-0109814 | 9/2014 |
| WO | 2014/072699 | 5/2014 |
| WO | 2014/095208 | 6/2014 |

OTHER PUBLICATIONS

Gibson, Ian, et al. Additive Manufacturing Technologies: Rapid Prototyping to Direct Digital Manufacturing. Springer, 2010. (Year: 2010).*
Official Communication issued in Patent Application No. PCT/JP2016/003510, dated Aug. 30, 2016.
English translation of International Report on Patentability issued in Patent Application No. PCT/JP2016/003510, dated Feb. 15, 2018.
Chinese Search Report issued in 201680044631.0, dated Dec. 23, 2019.
Office Action issued in Republic of Korea Counterpart Patent Appl. No. 2018-7002792, dated Jul. 1, 2019.
German Office Action issued in Application No. 11 2016 003 479 2, dated Aug. 31, 2021 and English language translation thereof.

* cited by examiner

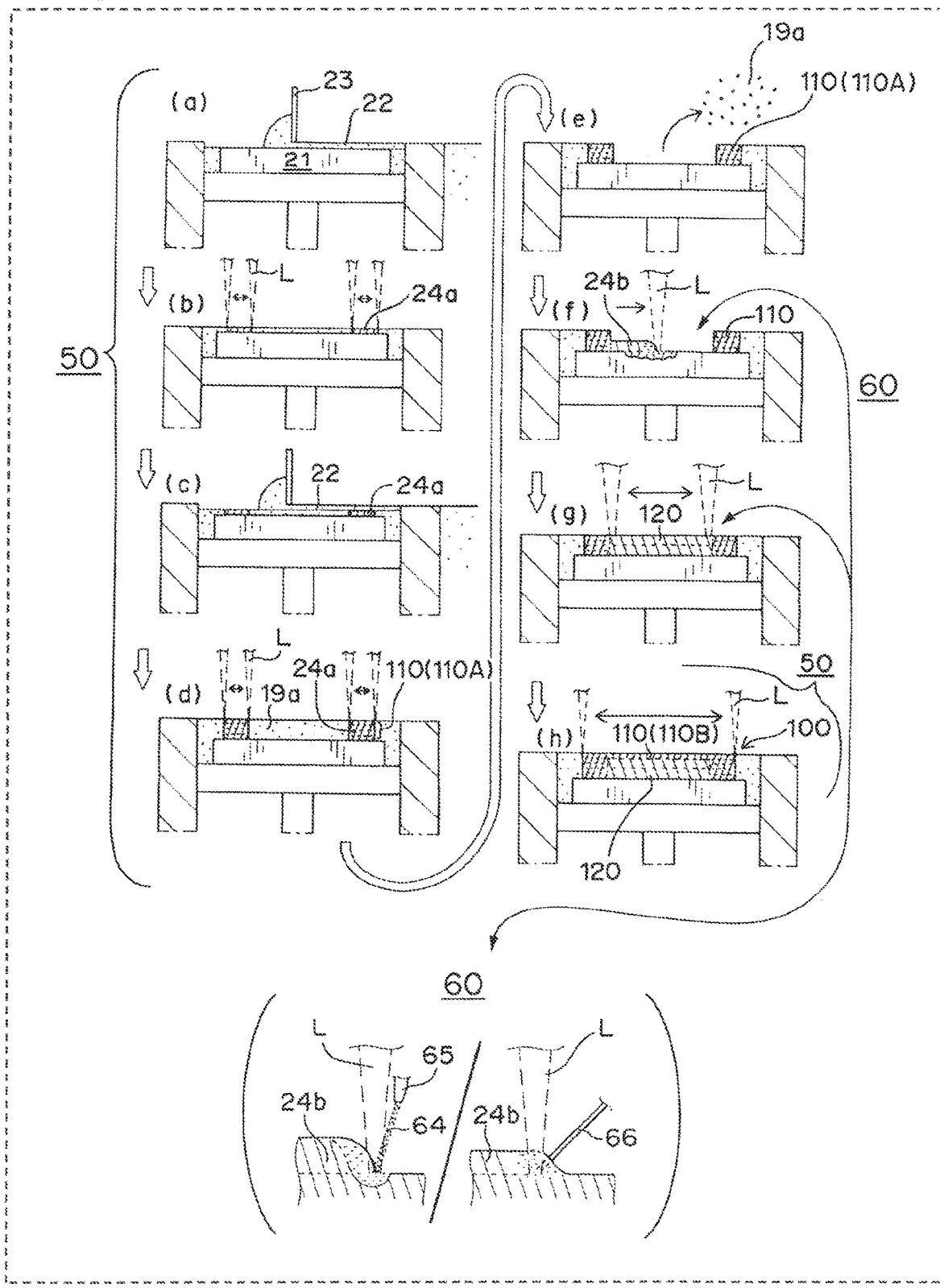

Fig. 7
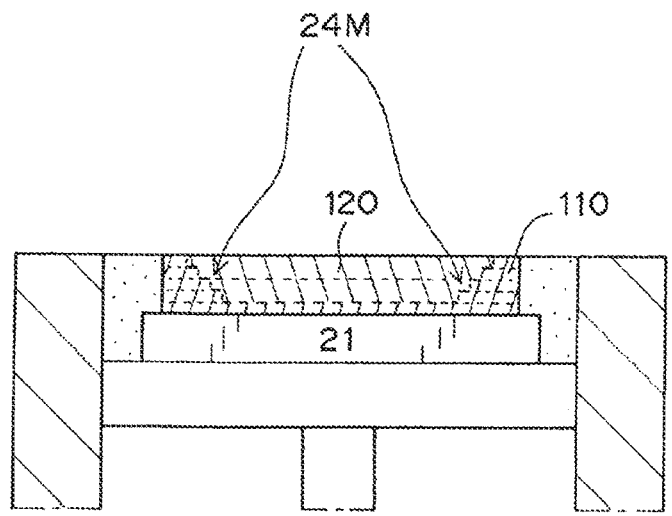
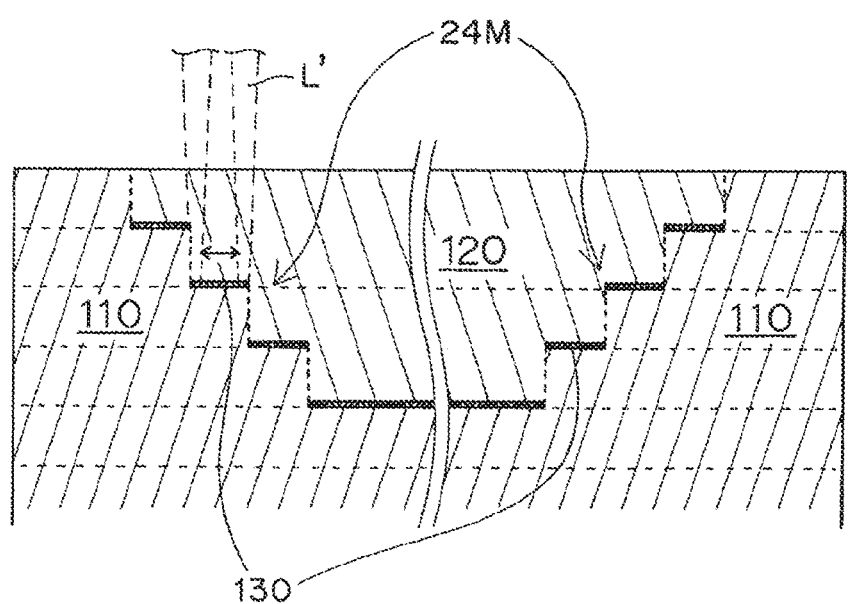

Fig. 8
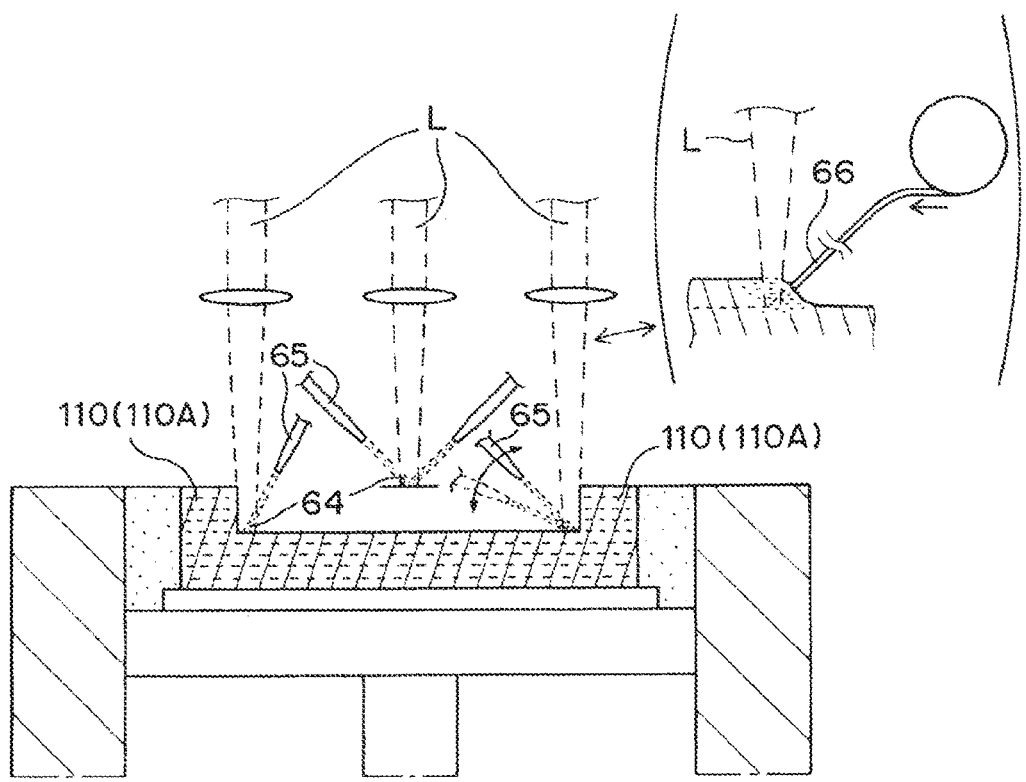
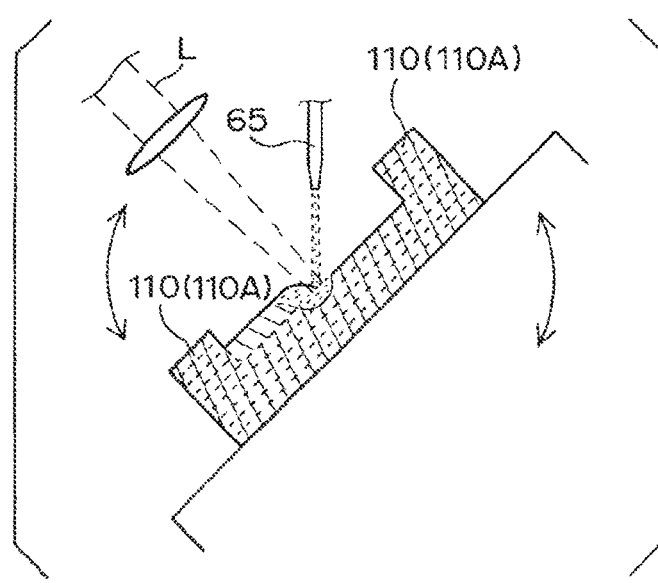

METHOD FOR MANUFACTURING THREE-DIMENSIONAL SHAPED OBJECT

TECHNICAL FIELD

The present disclosure relates to a method for manufacturing a three-dimensional shaped object. More particularly, the present disclosure relates to a method for manufacturing a three-dimensional shaped object by a successive formation of the solidified layers through a light beam irradiation.

BACKGROUND OF THE INVENTION

Heretofore, a method for manufacturing a three-dimensional shaped object by irradiating a powder material with a light beam has been known (such method can be generally referred to as "selective laser sintering method"). Such method can produce a three-dimensional shaped object by an alternate repetition of a powder-layer forming and a solidified-layer forming through the following steps (i) and (ii):

(i) forming a solidified layer by irradiating a predetermined portion of a powder layer with a light beam, thereby allowing sintering of the predetermined portion of the powder or melting and subsequent solidification thereof; and (ii) forming another solidified layer by forming a new powder layer on the resulting solidified layer, followed by similarly irradiating the powder layer with the light beam.

This kind of technology makes it possible to produce the three-dimensional shaped object with a complicated contour shape. The three-dimensional shaped object thus obtained can be used as a metal mold in a case where inorganic powder materials (e.g., a metal powder) are used as the powder material. While on the other hand, the three-dimensional shaped object can be used as a model or replica in a case where organic powder materials (e.g., a resin powder) are used as the powder material.

Taking a case as an example wherein the metal powder is used as the powder material, and the three-dimensional shaped object produced therefrom is used as the metal mold, the selective laser sintering method will now be briefly described. As shown in FIGS. 11A-11C, a powder layer 22 with its predetermined thickness is firstly formed on a base plate 21 by a movement of a squeegee blade 23 (see FIG. 11A). Then, a predetermined portion of the powder layer 22 is irradiated with a light beam "L" to form a solidified layer 24 therefrom (see FIG. 11B). Another powder layer 22 is newly provided on the solidified layer 24 thus formed, and is irradiated again with the light beam to form another solidified layer 24. In this way, the powder-layer forming and the solidified-layer forming are alternately repeated to cause the solidified layers 24 to be stacked with each other (see FIG. 11C). The alternate repetition of the powder-layer forming and the solidified-layer forming leads to a production of a three-dimensional shaped object with a plurality of the solidified layers stacked therein. The lowermost solidified layer 24 can be finally provided in a state of being adhered to the surface of the base plate 21. Therefore, there can be obtained an integration of the three-dimensional shaped object and the base plate 21. The integrated "three-dimensional shaped object" and "base plate" can be used as the metal mold as they are.

PATENT DOCUMENTS (RELATED ART PATENT DOCUMENTS)

PATENT DOCUMENT 1: Japanese Unexamined Patent Application Publication No. H01-502890

PATENT DOCUMENT 2: Japanese Unexamined Patent Application Publication No. 2000-73108

DISCLOSURE OF THE INVENTION

Problems to be Solved by the Invention

The inventors of the present application have found that the selective laser sintering method can face no very manufacturing efficiency, depending on the three-dimensional shaped object to be manufactured. The selective laser sintering method can generally provide a high accuracy of form/shape of the manufactured three-dimensional shaped object since the solidified layers with each thickness thereof being in the order of microns (e.g., about 50 μm) are successively formed. However, there are some cases in the selective laser sintering method wherein the manufacturing time can be not very highly satisfactory in spite of the high accuracy of form being finally provided. This is due to the fact that the stacked number of the solidified layers tends to be larger because of the small thickness of the each layer. Such no very high satisfaction of the manufacturing time becomes pronounced when the three-dimensional shaped object to be manufactured has its larger dimension.

Means for Solving the Problems

Under the above circumstances, the present invention has been created. That is, an object of the present invention is to provide a more efficient manufacturing method of the three-dimensional shaped object.

In order to achieve the above object, the present invention according to one embodiment thereof provides a method for manufacturing a three-dimensional shaped object by a successive formation of a plurality of solidified layers through a light beam irradiation, wherein the plurality of the solidified layers are provided by a hybrid of combined systems of an after irradiation system and a simultaneous irradiation system, the after irradiation system being such that the light beam irradiation is performed after a formation of a powder layer, the simultaneous irradiation system being such that the light beam irradiation is performed while a raw material is supplied.

Effect of the Invention

In accordance with the present invention, the three-dimensional shaped object can be more efficiently manufactured. More specifically, the manufacturing of the three-dimensional shaped object can be performed in a shorter period of time. Particularly even in a case where the three-dimensional shaped object has the larger dimension, the shorter time for manufacturing such larger object can be suitably provided.

BRIEF DESCRIPTION OF THE DRAWINGS

FIG. 4 is a cross-sectional view schematically showing a manufacturing method over time according to an embodiment of the present invention.

FIG. 7 is a cross-sectional view schematically showing an embodiment of "Stepped Form of Peripheral Solidified Portion".

FIG. 8 is a cross-sectional view schematically showing an embodiment of "Oblique Supply of Raw Material in Simultaneous Irradiation System".

MODES FOR CARRYING OUT THE INVENTION

Figure 1:
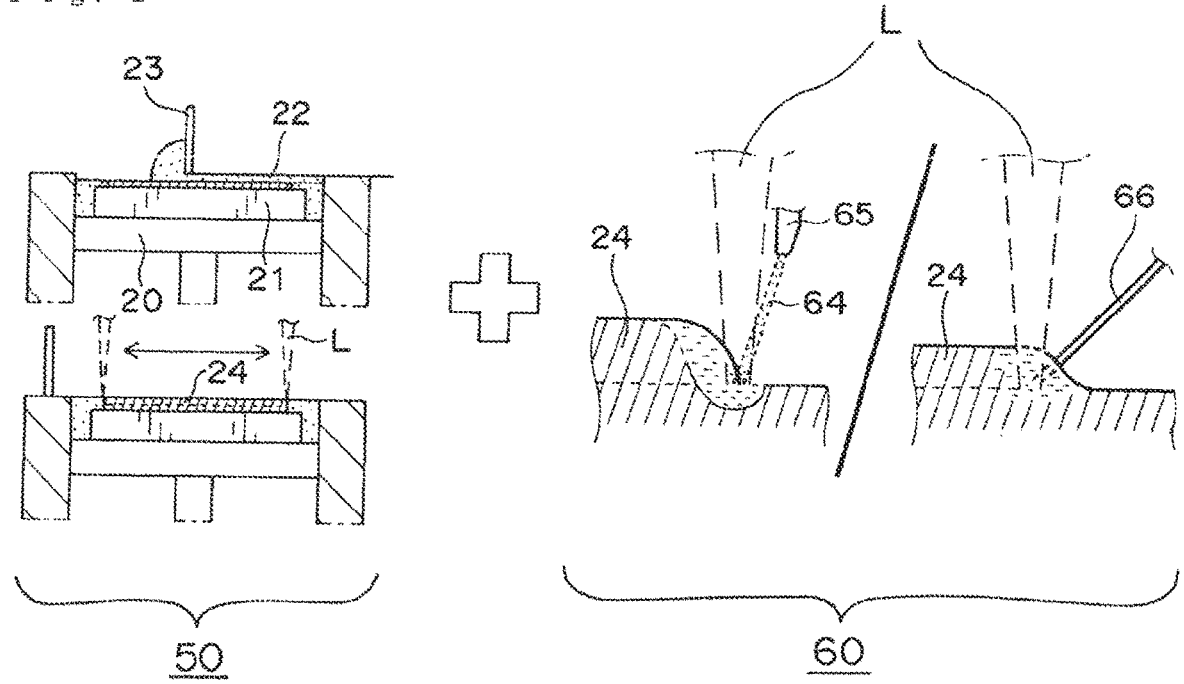
FIG. 1 is a sectional view schematically showing a concept of a manufacturing method according to an embodiment of the present invention.

The manufacturing method according to an embodiment of the present invention will be described in more detail with reference to the accompanying drawings. It should be noted that configurations/forms and dimensions in the drawings are merely for illustrative purposes, and thus not the same as those of the actual parts or elements.

The term "powder layer" as used in this description and claims means a "metal powder layer made of a metal powder" or "resin powder layer made of a resin powder", for example. The term "solidified layer" substantially means a "sintered layer" in a case where the powder layer is a metal powder layer, whereas term "solidified layer" substantially means a "cured layer" in a case where the powder layer is a resin powder layer.

The directions of "upper" and "lower", which are directly or indirectly used herein, are ones based on a stack direction of the solidified layers. The direction in which the solidified layers are stacked upon the manufacturing method of the present invention is "upper", and the opposite direction thereto is "lower".

[Selective Laser Sintering Method]

A selective laser sintering method, at least on which the manufacturing method of the present invention is based, will be firstly described.

The selective laser sintering method corresponds to an "after irradiation system" which will be later mentioned. Namely, the selective laser sintering method as the after irradiation system in which a solidified layer is formed by an irradiation of a powder layer with a light beam will be firstly described. By way of example, a laser-sintering/machining hybrid process is particularly raised in the following explanation of the selective laser sintering method wherein a machining process is additionally carried out with respect to the three-dimensional shaped object. It should be noted that the machining process is not necessarily needed in the selective laser sintering method.

Figure 11A:
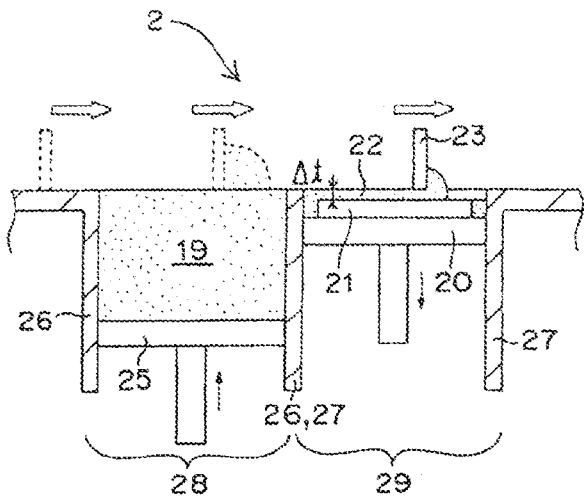
FIGS. 11A-11C are cross-sectional views schematically showing an embodiment in which a selective laser sintering method is carried out.
Figure 11B:
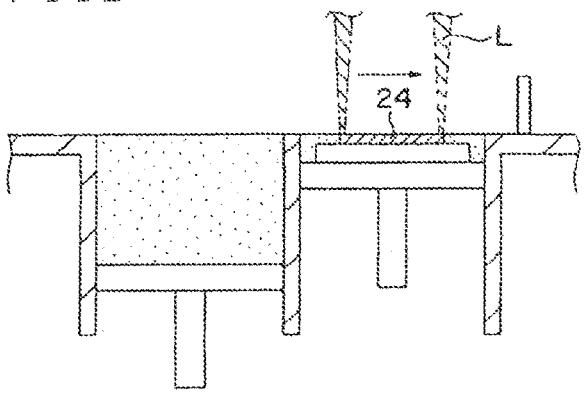
Figure 11C:
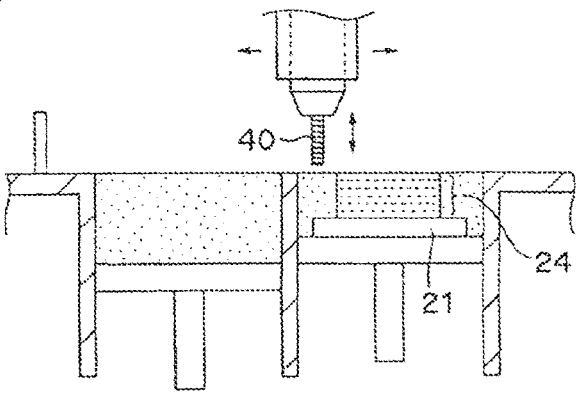
Figure 12:
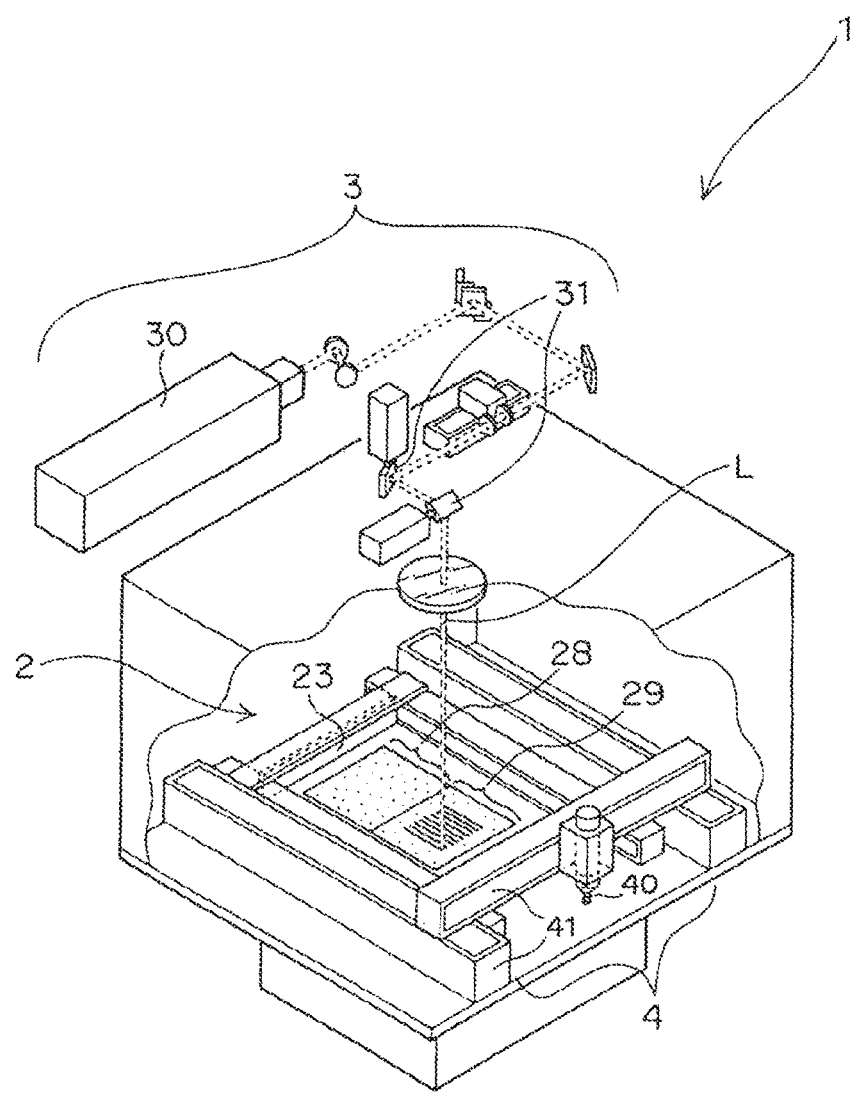
FIG. 12 is a perspective view schematically showing a constitution of a laser-sintering/machining hybrid machine by which a selective laser sintering method is carried out.
Figure 13:
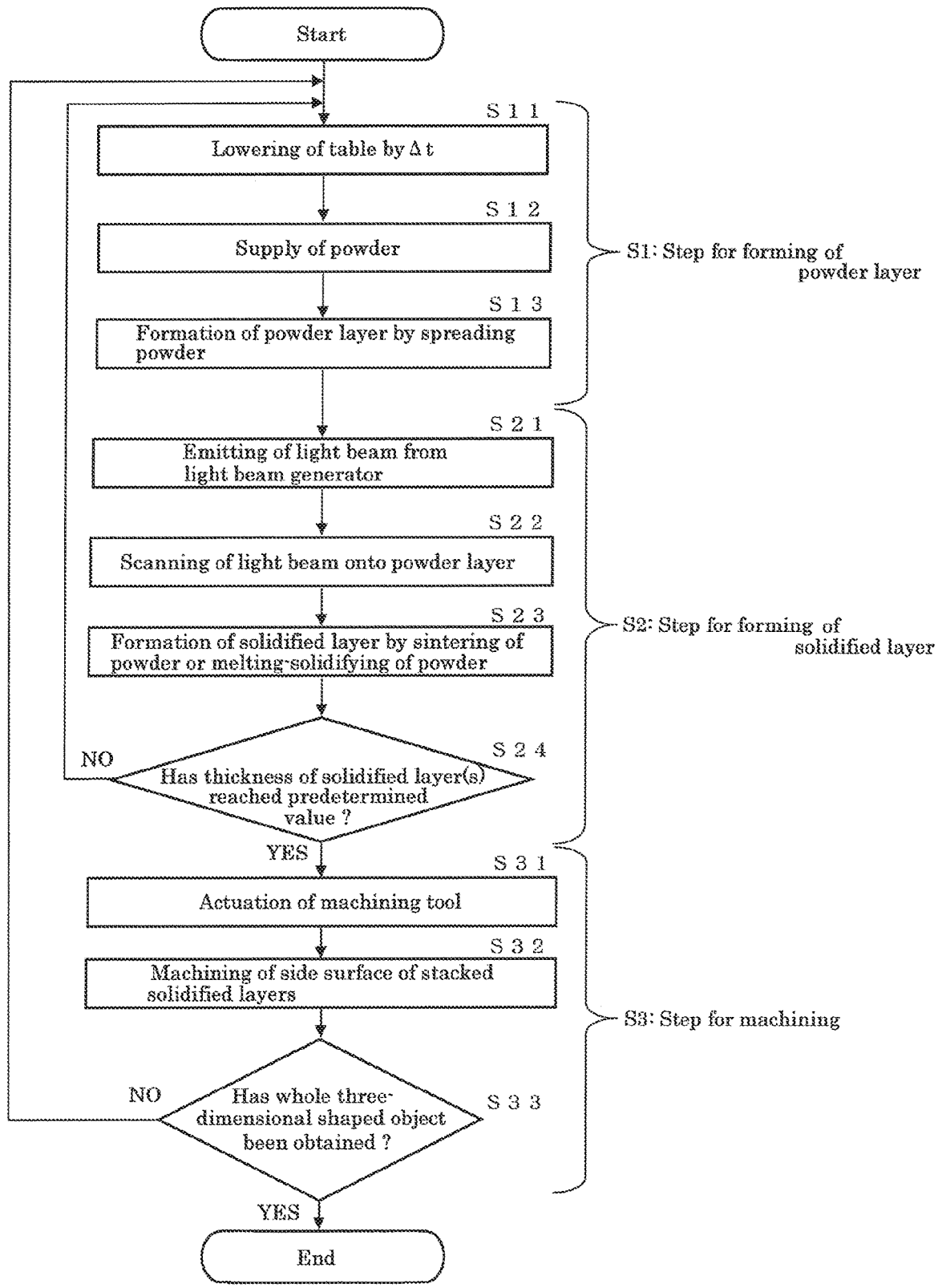
FIG. 13 is a flow chart of typical operations of a laser-sintering/machining hybrid machine.

FIG. 11 schematically shows a process embodiment of the laser-sintering/machining hybrid. FIGS. 12 and 13 respectively show major constructions and operation flow regarding a metal laser sintering hybrid milling machine for enabling an execution of the machining process as well as the selective laser sintering method.

As shown in FIG. 12, the laser-sintering/milling hybrid machine 1 is provided with a powder layer former 2, a light-beam irradiator 3, and a machining means 4.

The powder layer former 2 is a means for forming a powder layer with its predetermined thickness through a supply of powder (e.g., a metal powder or a resin powder). The light-beam irradiator 3 is a means for irradiating a predetermined portion of the powder layer with a light beam "L". The machining means 4 is a means for milling the side surface of the stacked solidified layers, i.e., the surface of the three-dimensional shaped object.

As shown in FIG. 11, the powder layer former 2 is mainly composed of a powder table 25, a squeegee blade 23, a forming table 20 and a base plate 21. The powder table 25 is a table capable of vertically elevating/descending in a "storage tank for powder material" 28 whose outer periphery is surrounded with a wall 26. The squeegee blade 23 is a blade capable of horizontally moving to spread a powder 19 from the powder table 25 onto the forming table 20, and thereby forming a powder layer 22. The forming table 20 is a table capable of vertically elevating/descending in a forming tank 29 whose outer periphery is surrounded with a wall 27. The base plate 21 is a plate for a shaped object. The base plate is disposed on the forming table 20 and serves as a platform of the three-dimensional shaped object.

As shown in FIG. 12, the light-beam irradiator 3 is mainly composed of a light beam generator 30 and a galvanometer mirror 31. The light beam generator 30 is a device for emitting a light beam "L". The galvanometer mirror 31 is a means for scanning an emitted light beam "L" onto the powder layer, i.e., a scan means of the light beam "L".

As shown in FIG. 12, the machining means 4 is mainly composed of a milling head 40 and an actuator 41. The milling head 40 is a cutting tool for milling the side surface of the stacked solidified layers. The actuator 41 is a means for driving the milling head 40 to move toward the position to be milled.

Operations of the laser sintering hybrid milling machine 1 will now be described in detail. As can be seen from the flowchart of FIG. 13, the operations of the laser sintering hybrid milling machine are mainly composed of a powder layer forming step (S1), a solidified layer forming step (S2), and a machining step (S3). The powder layer forming step (S1) is a step for forming the powder layer 22. In the powder layer forming step (S1), first, the forming table 20 is descended by Δt (S11), and thereby creating a level difference "Δt" between an upper surface of the base plate 21 and an upper-edge plane of the forming tank 29. Subsequently, the powder table 25 is elevated by Δt, and then the squeegee blade 23 is driven to move from the storage tank 28 to the forming tank 29 in the horizontal direction, as shown in FIG. 11A. This enables a powder 19 placed on the powder table 25 to be spread onto the base plate 21 (S12), while forming the powder layer 22 (S13). Examples of the powder for the powder layer 22 include a "metal powder having a mean particle diameter of about 5 μm to 100 μm" and a "resin powder having a mean particle diameter of about 30 μm to 100 μm, (e.g., a powder of nylon, polypropylene, ABS or the like)". Following this step, the solidified layer forming step (S2) is performed. The solidified layer forming step (S2) is a step for forming a solidified layer 24 through the light beam irradiation. In the solidified layer forming step (S2), a light beam "L" is emitted from the light beam generator 30 (S21). The emitted light beam "L" is scanned onto a predetermined portion of the powder layer 22 by means of the galvanometer mirror 31 (S22). The scanned light beam can cause the powder in the predetermined portion of the powder layer to be sintered or be melted and subsequently solidified, resulting in a formation of the solidified layer 24 (S23), as shown in FIG. 11B. Examples of the light beam "L" include carbon dioxide gas laser, Nd:YAG laser, fiber laser, ultraviolet light and the like.

The powder layer forming step (S1) and the solidified layer forming step (S2) are alternately repeated. This allows a plurality of the solidified layers 24 to be integrally stacked with each other, as shown in FIG. 11C.

When the thickness of the stacked solidified layers 24 reaches a predetermined value (S24), the machining step (S3) is initiated. The machining step (S3) is a step for milling the side surface of the stacked solidified layers 24, i.e., the surface of the three-dimensional shaped object. The milling head 40 (see FIG. 11C and FIG. 12) is actuated to initiate an execution of the machining step (S31). For example, in a case where the milling head 40 has an effective milling length of 3 mm, a machining can be performed with a milling depth of 3 mm. Thus, supposing that "Δt" is 0.05 mm, the milling head 40 is actuated when the formation of the sixty solidified layers 24 is completed. Specifically, the side face of the stacked solidified layers 24 is subjected to the surface machining (S32) through a movement of the milling head 40 driven by the actuator 41. Subsequent to the surface machining step (S3), it is judged whether or not the whole three-dimensional shaped object has been obtained (S33). When the desired three-dimensional shaped object has not yet been obtained, the step returns to the powder layer forming step (S1). Thereafter, the steps S1 through S3 are repeatedly performed again wherein the further stacking of the solidified layers 24 and the further machining process therefor are similarly performed, which eventually leads to a provision of the desired three-dimensional shaped object.

[Manufacturing Method of the Present Invention]

The present invention is characterized by features associated with the forming of the solidified layer in the manufacturing of three-dimensional shaped object. In particular, the solidified layers in the manufacturing according to an embodiment of the present invention are formed by a hybrid manner of combination of at least two types of systems.

Specifically, the formation of the solidified layers is performed by the hybrid manner of the combined systems of an "after irradiation system in which the light beam irradiation is performed after a formation of a powder layer" and a "simultaneous irradiation system in which the light beam irradiation is performed while a raw material is supplied".

The concept of the hybrid manner adopted in the manufacturing method according to an embodiment of the present invention is shown in FIG. 1. As can be seen from FIG. 1, the hybrid manner lies in combined systems of the "after irradiation system 50" and the "simultaneous irradiation system 60"—both of which differ from each other in the formation of the solidified layer 24.

As shown in FIG. 1, the after irradiation system 50 corresponds to the selective laser sintering method as described above, in which the powder layer 22 is formed, followed by the formation of the solidified layer 24 being performed by an irradiation of the powder layer 22 with an light beam "L". While on the other hand, the simultaneous irradiation system 60 is a system in which the solidified layer 24 is formed by substantially concurrent performances of the supply of the raw material and the irradiation of the light beam "L".

As such, the term "after irradiation system" as used in this description and claims means a type of the formation of the solidified layer wherein the powder layer is once formed, followed by the predetermined portion thereof being irradiated with the light beam to form the solidified layer through the sintering of the powder of the predetermined portion or the melting and subsequent solidification thereof. While on the other hand, the term "simultaneous irradiation system" as used in this description and claims means another type of the formation of the solidified layer wherein the solidified layer is directly formed with no formation of the powder layer, in which the raw material supply and the light beam irradiation are substantially concurrently performed to allow the sintering of the supplied powder or the melting and subsequent solidification of the supplied powder.

The manufacturing method according to an embodiment of the present invention can more efficiently produce the three-dimensional shaped object. This is due to the matter that the three-dimensional shaped object is manufactured by the combination of the after-irradiation and simultaneous-irradiation systems which differs from each other in terms of shape/form accuracy and manufacturing time. The after irradiation system has such a feature that it enables the accuracy of the shape/form to be higher, but it renders the time for the formation of the solidified layer longer. While on the other hand, the simultaneous irradiation system has such a feature that it has the lower accuracy of the shape/form, but it enables the time for the formation of the solidified layer to be shorter. As such, the after irradiation system and the simultaneous irradiation system, which have the opposing features to each other, are combined to more efficiently produce the desired three-dimensional shaped object. More specifically, the manufacturing method according to an embodiment of the present invention mutually complements the positive and down sides of the respective ones of the after-irradiation and simultaneous-irradiation systems to allow the three-dimensional shaped object to be manufactured with its desired accuracy of shape/form within a shorter time.

The details on the "after irradiation system" and the "simultaneous irradiation system" will be now described. The after irradiation system corresponds to the selective laser sintering method described above. Thus, as for the after irradiation system, the powder layer is firstly formed by the use of the squeegee blade or the like. Subsequent to the formation of the powder layer, the predetermined portion of the powder layer is irradiated with the light beam. This allows the sintering of the powder of the predetermined portion or the melting and subsequent solidification of such powder, and thereby forming the solidified layer therefrom. Subsequently, the new powder layer is similarly formed on the solidified layer thus formed, and is irradiated again with the light beam to form another solidified layer. In this way, the powder-layer forming and the solidified-layer forming are alternately repeated, and thereby the three-dimensional shaped object with the stacked solidified layers can be finally provided.

The term "predetermined portion of a powder layer" as used herein substantially means a portion of a three-dimensional shaped object to be manufactured. As such, a powder present in such predetermined portion is irradiated with a light beam, and thereby the powder undergoes a sintering or a melting and subsequent solidification to form the solidified layer as a part of a three-dimensional shaped object.

In contrast, as for the simultaneous irradiation system, the raw material supply is performed substantially at the same time when the light beam irradiation is performed in order to form the solidified layer. When compared to the after irradiation system, the simultaneous irradiation system has a feature of no formation of the powder layer itself to be used for the formation of the solidified layer.

As a raw material for the simultaneous irradiation system, a powder or a welding material (filler material product) is used. This means that the simultaneous irradiation system is provided such that the light beam irradiation is performed with respect to a supply point of raw material while the powder or welding material is supplied to such point, and thereby the solidified layer is formed directly from the supplied powder or welding material.

In a case where the powder is used, the light beam irradiation with respect to the powder during the supplying of the powder is performed to allow the sintering of the powder or the melting and subsequent solidification thereof. This causes the solidified layer to be formed directly from the supplied powder. Preferably, the powder is sprayed onto a focused light beam of the irradiation (i.e., an irradiation portion with the light "L" being at the "supply point of raw material"), and thereby allowing the sintering of the sprayed powder or the melting and subsequent solidification thereof to form the solidified layer 24 (see FIG. 1). As shown in FIG. 1, a powder supply nozzle 65 may be used for the spraying of the powder 64.

The kind of the powder to be used for the simultaneous irradiation system may be the same as that of the after irradiation system. Namely, the powder for the formation of the powder layer in the after irradiation system may be used as the powder to be supplied in the simultaneous irradiation system.

In a case where the welding material is used, a part of the welding material is rendered to be melted such that the melted material directly forms the solidified layer. Preferably, the welding material 66 is supplied to reach the focused light beam (i.e., an irradiation portion with the light "L" being at the "supply point of raw material"), and thereby allowing the melted part of the welding material 66 to form the solidified layer 24 (see FIG. 1). As shown in FIG. 1, the welding material 66 is provided such that the end of the welding material 66 is irradiated with the light beam "L". This causes such end of the welding material 66 to be melted, and thus the melted material can form the solidified layer 24.

The term "welding material" as used in this description and claims means a raw material for a weld to be used in the field of a so-called welding technology. From a standpoint of the present invention, the welding material is a fusible material capable of melting upon the irradiation thereof with the light beam. The welding material may be made typically of a metal, but the present invention is not necessarily limited thereto. It is preferred that the welding material may be, but not limited to, in an elongated form such as "form of wire", "form of rod" and the like. The reason for this is that not only the welding material in the elongated form is easy to melt upon the light beam irradiation, but also the melted material therefrom can be more accurately supplied to the desired point.

It is preferred that a metal wire is used as the welding material. Keeping the end of the metal wire at the focused light beam can cause such end to successively melt to form the solidified layer directly from the melted material therefrom. The term "metal wire" used in this description and claims means a metal material having an elongated form like "wire", as appreciated by its name.

According to an embodiment of the present invention, the simultaneous irradiation system preferably provides the larger thickness of the solidified layer. In other words, it is preferred that the thickness of the solidified layer to be formed by the simultaneous irradiation system is larger than that of the after irradiation system. This enables the formation of the solidified layer according to the simultaneous irradiation system to be performed in a shorter time than the formation of the solidified layer according to the after irradiation system, which can lead to a more efficient manufacturing of the three-dimensional shaped object. The thickness$_{simultaneous\ irradiation}$ of the solidified layer according to the simultaneous irradiation system may be, but not limited to, about the 2 to 500 times the thickness$_{after\ irradiation}$ of the solidified layer according to the after irradiation system. It is preferred that the thickness$_{simultaneous\ irradiation}$ of the solidified layer according to the simultaneous irradiation system is about the 2 to 250 times the thickness$_{after\ irradiation}$ of the solidified layer according to the after irradiation system. It is more preferred that the thickness$_{simultaneous\ irradiation}$ of the solidified layer according to the simultaneous irradiation system is about the 5 to 150 times the thickness$_{after\ irradiation}$ of the solidified layer according to the after irradiation system.

The simultaneous irradiation system makes it possible to more widely form the solidified layer per unit time. As such, it is preferred that a spot diameter of the light beam irradiation in the simultaneous irradiation system is larger than that of the after irradiation system. This also enables the formation of the solidified layer according to the simultaneous irradiation system to be performed in a shorter time than the formation of the solidified layer according to the after irradiation system, which can lead to a more efficient manufacturing of the three-dimensional shaped object. The term "spot diameter of the light beam irradiation" used in this description and claims means a diameter of the light beam (diameter of focused light beam for irradiation) at the supply point of raw material. The spot diameter$_{simultaneous\ irradiation}$ in the simultaneous irradiation system may be, but not limited to, about the 1.5 to 100 times the spot diameter$_{after\ irradiation}$ in the after irradiation system. It is preferred that the spot diameter$_{simultaneous\ irradiation}$ in the simultaneous irradiation system is about the 2 to 80 times the spot diameter$_{after\ irradiation}$ in the after irradiation system. It is more preferred that the spot diameter$_{simultaneous\ irradiation}$ in the simultaneous irradiation system is about the 2 to 40 times the spot diameter$_{after\ irradiation}$ in the after irradiation system.

The hybrid manner adopted in the manufacturing method according to an embodiment of the present invention can suitably select which system of "after irradiation system" or "simultaneous irradiation system" should be performed, depending on which portion of the three-dimensional shaped object the solidified layer to be formed corresponds to. It is preferred that the after irradiation system is performed for a formation of a "peripheral solidified portion 110 corresponding to a periphery of the three-dimensional shaped object 100", whereas the simultaneous irradiation system is performed for a formation of an "internal solidified portion 120 corresponding to an internal region of the three-dimensional shaped object 100, the internal region being located inside the periphery". See FIG. 2.

Figure 3A:
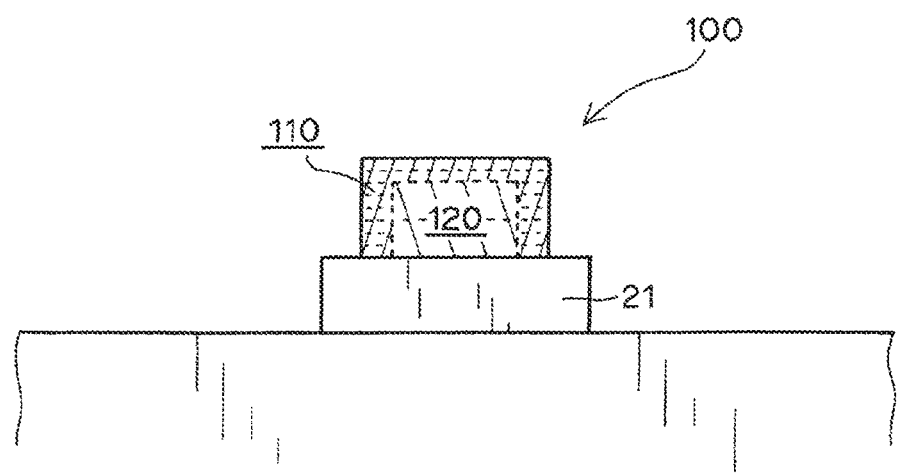
FIGS. 3A-3B are sectional views schematically showing a three-dimensional shaped object obtained by a manufacturing method according to an embodiment of the present invention.
Figure 3B:
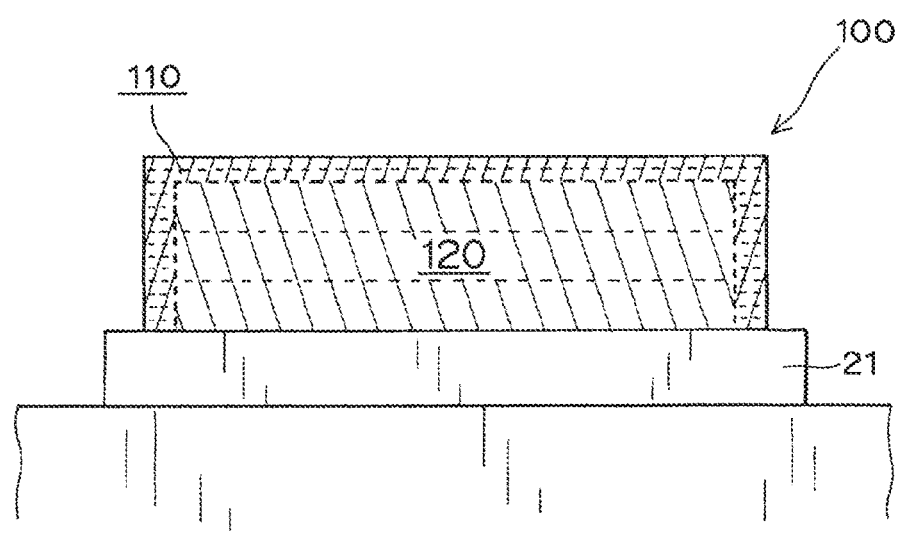

The after irradiation system having a feature of higher accuracy of form/shape is suited for the formation of the peripheral solidified portion 110. This is because the peripheral solidified portion 110 finally corresponds to an outer surface of the three-dimensional shaped object. While on the other hand, the simultaneous irradiation system having a feature of shorter time for the formation of the solidified layer is suited for the formation of the internal solidified portion 120. This is because the internal solidified portion 120 finally corresponds to most of the solid portion of the three-dimensional shaped object 100, and thus occupies a larger volume in the three-dimensional shaped object 100. Accordingly, with the hybrid manner according to the above embodiment of the present invention, the three-dimensional shaped object 100 can be obtained with its higher accuracy of form/shape in a shorter time. Such advantageous effect of the present invention becomes pronounced when the three-dimensional shaped object to be manufactured has its larger dimension. This will be explained in more detail with reference to FIGS. 3A and 3B. When compared to a small three-dimensional object 100 with its smaller dimension (see FIG. 3A), a lager three-dimensional shaped object 100 with its lager dimension has a larger volume of the internal solidified portion 120 (see FIG. 3B). When such larger volume of the internal solidified portion 120 undergoes the effect of the simultaneous irradiation system with its feature of the shorter formation time, it is made possible to enhance the shorter time effect for the manufacturing of the larger three-dimensional shaped object 100.

The term "periphery" used in this description and claims means an outer exposed surface section of the three-dimensional shaped object. In other words, the phrase "peripheral solidified portion" used herein substantially means a local section corresponding to a peripheral section of the solidified layer or stacked solidified layers. The peripheral solidified portion in the present invention may be regarded as having a width dimension in the outer peripheral contour of the three-dimensional shaped object, and thus the peripheral solidified portion in the present invention may correspond to a local portion which extends from the outermost surface of the three-dimensional shaped object to the inner point (i.e., the horizontal direction inner point) by about 1 mm to about 10 cm. While on the other hand, term "internal solidified portion" used herein means a solid section of the three-dimensional shaped object, the solid section being located inside the periphery in the solidified layer or stacked solidified layers. Namely, the internal solidified portion corresponds to a section other than the periphery in the three-dimensional shaped object.

Figure 2:
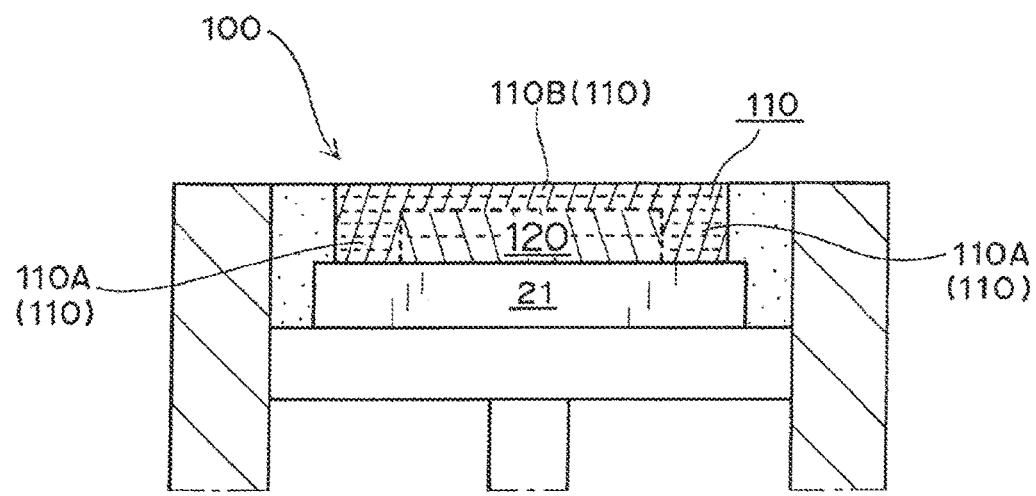
FIG. 2 is a sectional view schematically showing a peripheral solidified portion and an internal solidified portion concerning a three-dimensional shaped object.

In a preferred embodiment, as shown in FIG. 2, the periphery is at least one of a side surface portion 110A and a top surface portion 110B of the three-dimensional shaped object 100. This is because, based on the solidified layers being stacked on the base plate 21, the three-dimensional shaped object 100, which is to be finally produced on the base plate, has its outer portion as the side surface portion 110A and the top surface portion 110B.

With reference to FIGS. 4(a)-4(h), the manufacturing process over time according to an embodiment of the present invention will be now described. The manufacturing process of FIGS. 4(a)-4 (h) is concerned with such an embodiment that the peripheral solidified portion 110 is formed by the after irradiation system 50 whereas the internal solidified portion 120 is formed by the simultaneous irradiation system 6C.

As can be seen from FIGS. 4(a)-4(h), the manufacturing process according to the present invention is such that the after irradiation system 50 for the formation of the peripheral solidified portion 110 corresponding to the side surface portion 110A is performed prior to the performance of the simultaneous irradiation system 60 for the formation of the internal solidified portion 120. In other words, the peripheral solidified portion corresponding to the side surface portion 110A is formed by the after irradiation system 50, and thereafter the internal solidified portion 120 is formed by the simultaneous irradiation system 60. This makes it possible to more efficiently produce the three-dimensional shaped object. In this regard, the formation of the periphery corresponding to the outermost portion of the three-dimensional shaped object 100 allows the formation area for the internal solidified portion 120 to be preliminarily ensured since the internal solidified portion is located inside the periphery, which can lead to an easier performance of the simultaneous irradiation system 60 for the formation of the internal solidified portion.

In the manufacturing method shown in FIGS. 4(a)-4 (h), the after irradiation system 50 is firstly performed. As shown in FIG. 4(a), a powder layer 22 with its predetermined thickness is firstly formed on a base plate 21 by a movement of a squeegee blade 23. Then, as shown in FIG. 4(b), a powder region corresponding to the side surface portion in the powder layer 22 is irradiated with the light beam "L" to form a side-face solidified layer 24a therefrom. Subsequently, as shown in FIGS. 4(c) and 4 (d), another powder layer 22 is newly provided, and then is irradiated again with the light beam to form another side-face solidified layer 24a. In this way, the powder-layer forming and the solidified-layer forming are alternately repeated to produce the peripheral solidified portion 110 corresponding to the side surface portion 110A of the three-dimensional shaped object (see FIG. 4(d)).

Figure 5:
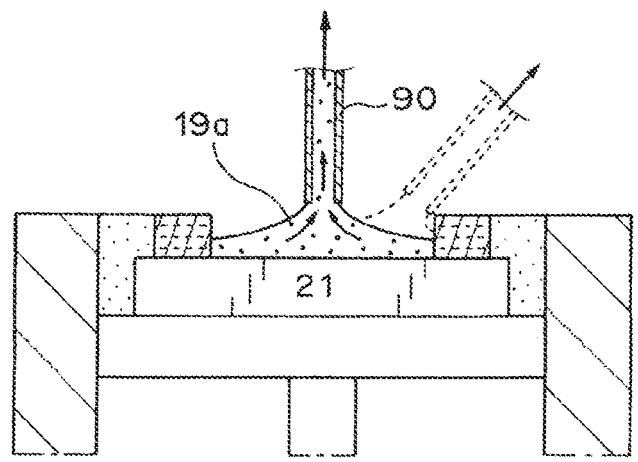
FIG. 5 is a cross-sectional view schematically showing an embodiment of "Suction Removal of Powder".

Subsequent to the after irradiation system 50, the simultaneous irradiation system 60 is performed. As shown in FIG. 4(e), it is preferred that, prior to the performance of the simultaneous irradiation system 60, a residual powder 19a of the powder layer is sucked to be removed, the residual powder having been not used for the formation of the peripheral solidified portion 110. In other words, it is preferred that the residual powder 19a of the powder layer, which is left due to no use for the formation of the peripheral solidified portion 110 corresponding to the side surface portion 110A, is sucked to be removed at a point in time after the performance of the after irradiation system 50 for the formation of the peripheral solidified portion 110 corresponding to the side surface portion 110A, and also before the performance of the simultaneous irradiation system 60 for the formation of the internal solidified portion 120. Such suction removal of the residual powder 19a allows the simultaneous irradiation system 60 to be more suitably performed. If the residual powder 19a, which has been not used for the formation of the peripheral solidified portion 110, still remained, then the area for the simultaneous irradiation system 60 could not be satisfactorily ensured. This means that the removal of such powder 19a can suitably provide the area for the simultaneous irradiation system 60. As shown in FIG. 5, the suction removal of the residual powder 19a may be performed from above by a suction nozzle 90, for example.

Next, as shown in FIGS. 4(f) and 4(g), an internal solidified layer 24b is formed by the performance of the simultaneous irradiation system 60. This can provide the internal solidified portion 120 which corresponds to an internal region located inside the periphery in the three-dimensional shaped object. As can be seen from FIGS. 4(a)-4(h) (in particular, the illustration shown lower than those 4(a)-4(h)), the supply of the powder 64 or welding material 66 and the irradiation of the light beam "L" are substantially concurrently performed with each other at the internal region inside the periphery, and thereby suitably forming the internal solidified layer 24b directly from the supplied powder 64 or welding material 66. For example, the thickness of the internal solidified layer 24b to be formed by the simultaneous irradiation system 60 can be made larger than the thickness of the side-face solidified layer 24a to be formed by the after irradiation system 50, which leads to an efficient formation of the internal solidified portion 120.

Subsequently, as shown in FIG. 4(h), the peripheral solidified portion 110 corresponding to the top surface portion 110B of the three-dimensional shaped object is formed by the after irradiation system 50. This allows the top surface portion 110B of the three-dimensional shaped object 100 to have a suitable accuracy of shape/form as the outer surface of the three-dimensional shaped object 100.

Throughout the above steps, the three-dimensional shaped object 100 having the higher accuracy of shape/form can be finally obtained in the shorter time.

Figure 6:
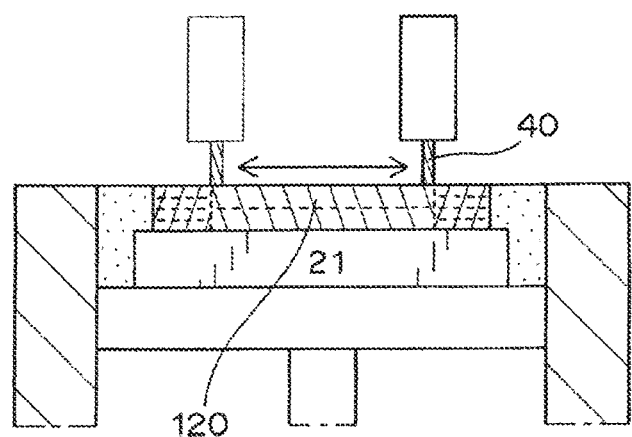
FIG. 6 is a cross-sectional view schematically showing an embodiment of "Surface-Machining Process".

It should be noted that the after irradiation system for the formation of the top surface portion 110B is not necessarily required. With no formation of the top surface portion 110B, a surface-machining process may be performed after the formation of the internal solidified portion 120 performed by the simultaneous irradiation system (see FIG. 6). Specifically, as shown in FIG. 6, the upper surface of the internal solidified portion 120 performed by the simultaneous irradiation system may be subjected to the surface machining process by a cutting tool (e.g., a milling head 40). This makes it possible for the internal solidified portion 120 performed by the simultaneous irradiation system, which may not have very high accuracy of the form, to become to have an improved accuracy of the form at the machined area thereof.

Although some typical embodiments of the present invention have been hereinbefore described for better understanding of the inventions, various specified embodiments of the present invention are possible.

(Different Kind of Material)

According to an embodiment of the present invention, the powder layer for the after irradiation system and the raw material for the simultaneous irradiation system may be different from each other in terms of kind of material. Namely, the material kind of the powder of the powder layer used in the after irradiation system may be different from that of the powder or welding material used in the simultaneous irradiation system. This makes it possible to produce the three-dimensional shaped object which is more suited for an actual use application. For example, in a case where the three-dimensional shaped object 100 is to be used as a metal mold, the powder layer used in the after irradiation system for the formation of the peripheral solidified portion 110 may have a Fe-based material, whereas the powder used in the simultaneous irradiation system for the formation of the internal solidified portion 120 may have a Cu-based material (see FIG. 2). The Fe-based material exhibits relatively harder property, whereas the Cu-based material exhibits a higher thermal conductivity, which makes it possible for the metal mold to have a hard outer surface thereof, and also an improved efficiency of heat transfer as a whole. Alternatively, in a case where the three-dimensional shaped object is intended to be light-weighted as a whole, the powder layer used in the after irradiation system for the formation of the peripheral solidified portion 110 may have a Fe-based material, whereas the powder used in the simultaneous irradiation system for the formation of the internal solidified portion 120 may have a Al-based material (see FIG. 2). An aluminium is a metal having a lower density. Thus, the internal solidified portion 120, which corresponds to most of the solid portion of the three-dimensional shaped object 100 and thus occupies the larger volume in the shaped object, can be provided as a lower-density portion with the use of such lower-density aluminium.

(Stepped Form of Peripheral Solidified Portion)

According to an embodiment of the present invention, as shown in FIG. 7, the after irradiation system may be performed such that a "surface 24M of the peripheral solidified portion" has a stepped form, the surface corresponding to an interface between the peripheral solidified portion 110 and the internal solidified portion 120. This allows a formation of an alloy composition to be facilitated at the interface between the peripheral solidified portion 110 and the internal solidified portion 120 especially in a case where the powder layer for the after irradiation system and the raw material for the simultaneous irradiation system are different from each other in terms of their kinds of metal material. In other words, as shown in the lower part of FIG. 7, an alloy-composition region 130 can be formed at the interface between the peripheral solidified portion 110 and the internal solidified portion 120.

In the simultaneous irradiation system according to a preferred embodiment of the present invention, the raw material is supplied while the light beam irradiation is maintained, and thereby the peripheral solidified portion, which has been already formed, undergoes the light beam irradiation to be partially melted. This allows the raw material to be supplied onto the partially melted part of the peripheral solidified portion, which leads to an intermixing of "component of the peripheral solidified portion (i.e., metal component thereof in particular)" and "component of the raw material supplied by the simultaneous irradiation system (i.e., metal component thereof in particular)". As a result, there can be finally formed a solidified region of the alloy composition. In this regard, the stepped form of the surface of the peripheral solidified portion can facilitate the horizontal surface thereof to undergo the light beam irradiation, and thereby promoting a melting of the peripheral solidified portion. That is, when the surface of the peripheral solidified portion has the stepped form, an alloy-composition region 130 is facilitated to be formed at the interface between the peripheral solidified portion and the internal solidified portion (see FIG. 7). The lower part of FIG. 7 schematically shows an embodiment wherein the peripheral solidified portion 110 corresponding to the side surface portion of the three-dimensional shaped object is formed by the after irradiation system, and thereafter the internal solidified portion 120 is formed by the simultaneous irradiation system using the light beam "L'".

As shown in FIG. 7, the surface in the stepped form has a taper profile from a macroscopic point of view, and thus the alloy-composition region 130 can be obliquely provided as a whole. This means that the solidified region of the alloy composition can be provided as an oblique form at the interface between the peripheral solidified portion and the internal solidified portion, making it possible to improve a structural strength. The improved structural strength can effectively prevent the downside risk of the "breaking/cracking" of the three-dimensional shaped object.

(Oblique Supply of Raw Material in Simultaneous Irradiation System)

According to an embodiment of the present invention, as shown in FIG. 8, the supply of the raw material in the simultaneous irradiation system may be performed in an "oblique" direction. Specifically, as shown in FIG. 8, the raw material is supplied at an angle with respect to the stacking direction of solidified layers of the three-dimensional shaped object. In a case where the powder 64 is used in the simultaneous irradiation system, a powder supply nozzle 65 (a nozzle axis thereof in particular) may be orientated so that it forms an angle with respect to the stacking direction of the solidified layers. In this case, the powder supply nozzle 65 can be driven so that the supply of the raw material in the oblique direction is provided. Alternatively, a platform for the stacking of the solidified layers, i.e., the forming table and/or the base plate provided thereon can be driven so that the supply of the raw material in the oblique direction is provided. Moreover, the driving of the powder supply nozzle 65 and the driving of the platform for the stacked solidified layers may be performed concurrently with each other in order to obliquely supply the raw material.

The oblique supply of the raw material can avoid a physical interference between the already-formed peripheral solidified portion 110 corresponding to the side surface portion 110A and the powder supply nozzle 65 or welding material 66, which can lead to a more suitable supply of the raw material.

(Wall Solidified Portion for Hollow Portion)

Figure 9:
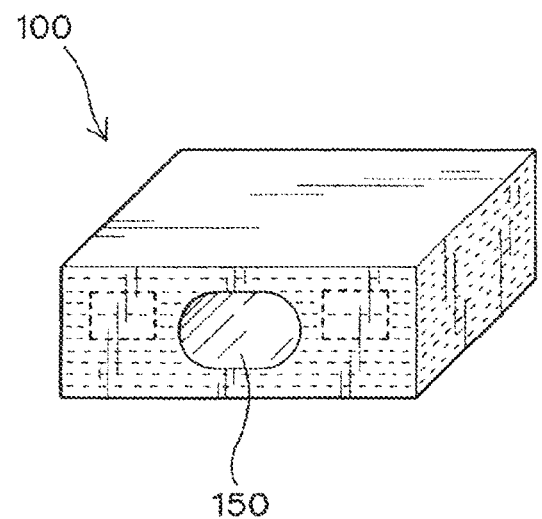
FIG. 9 is a perspective view schematically showing a three-dimensional shaped object having a hollow portion.

In the manufacturing method according to an embodiment of the present invention, it is preferred that a wall-surface portion for a hollow portion of the three-dimensional shaped object is formed by the after irradiation system. Specifically, in a case where the three-dimensional shaped object 100 to be manufactured has a hollow portion 150 (see FIG. 9), it is preferred that a wall solidified portion made of the solidified layers is formed by the after irradiation system, the wall solidified portion corresponding to a wall for forming the hollow portion 150 of the three-dimensional shaped object 100. See FIGS. 10A to 10E. The hollow portion 150 can be used as a temperature-control medium path when the three-dimensional shaped object 100 is used as the metal mold. In this regard, the after irradiation system having the higher accuracy of shape/form is more suited for the desired shape of the temperature-control medium path.

Figure 10A:
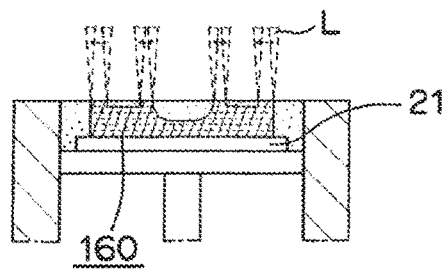
FIGS. 10A-10E are sectional views schematically showing the steps in a manufacturing method for the three-dimensional shaped object having the hollow portion.
Figure 10B:
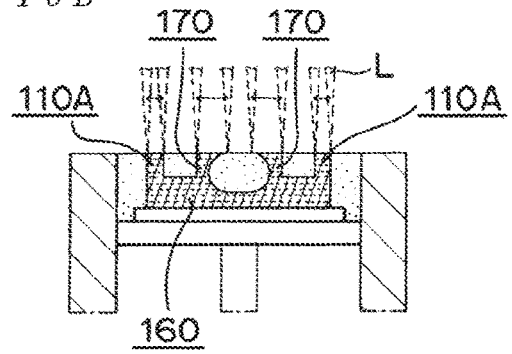
Figure 10C:
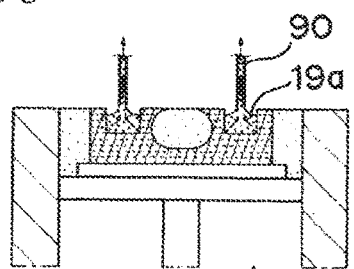
Figure 10D:
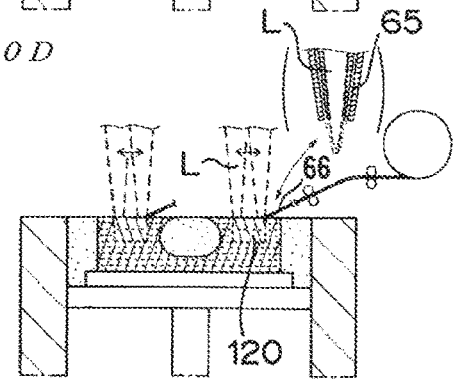
Figure 10E:
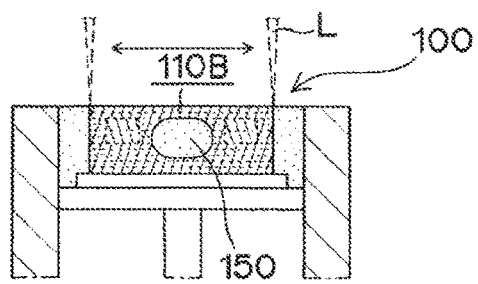

As for the embodiment of FIGS. 10A to 10E, the after irradiation system is performed not only for the formation of the wall solidified portion 170 composed of the solidified layers is formed by the after irradiation system, the wall solidified portion corresponding to a wall for the hollow portion 150 of the three-dimensional shaped object 100, but also for the formation of other solidified portions. Specifically, the solidified portions corresponding to the side surface portion 110A and the top surface portion 110B are formed by the after irradiation system (see FIGS. 10B and 10E), and also a bottom solidified portion corresponding to a bottom portion 160 of the three-dimensional shaped object is formed by the after irradiation system (see FIG. 10A). While on the other hand, the solidified portions other than that of the side surface portion 110A, the top surface portion 110B and the bottom portion 160 are formed by the simultaneous irradiation system. As for the embodiment of FIGS. 10A to 10E, the internal portion corresponding to the inside of the side surface portion 110A and wall solidified portion 170 is formed by the simultaneous irradiation system. More specifically, the residual powder 19a is removed by sucking thereof as shown in FIG. 10C, and thereafter the supply of the welding material 66 and the irradiation of light beam "L" are substantially concurrently performed with each other to form the solidified portion 120 as shown in FIG. 10D. Instead of using the welding material 66, the powder 64 can be used to be sprayed by the powder supply nozzle 65.

As such, even when the three-dimensional shaped object 100 to be manufactured has the hollow portion 150, the present invention according to the embodiment of FIGS. 10A to 10E makes it possible to produce the shaped object with a higher accuracy of the shape/form and in the shorter time.

It should be noted that the present invention as described above includes the following aspects:

First aspect: A method for manufacturing a three-dimensional shaped object by a successive formation of a plurality of solidified layers through a light beam irradiation,
wherein the solidified layers are provided by a hybrid of combined systems of an after irradiation system and a simultaneous irradiation system, the after irradiation system being such that the light beam irradiation is performed after a formation of a powder layer, the simultaneous irradiation system being such that the light beam irradiation is performed while a raw material is supplied.

Second aspect: The method according to the First aspect, wherein a thickness of the solidified layer to be formed by the simultaneous irradiation system is larger than that of the after irradiation system.

Third aspect: The method according to the First or second aspect, wherein a spot diameter of the light beam irradiation in the simultaneous irradiation system is larger than that of the after irradiation system.

Fourth aspect: The method according to any one of the First to third aspects, wherein the after irradiation system is performed for a formation of a peripheral solidified portion corresponding to a periphery of the three-dimensional shaped object, whereas the simultaneous irradiation system is performed for a formation of an internal solidified portion corresponding to an internal region of the three-dimensional shaped object, the internal region being located inside the periphery.

Fifth aspect: The method according to the Fourth aspect, wherein the periphery is at least one of a side surface portion and a top surface portion of the three-dimensional shaped object.

Sixth aspect: The method according to any one of the First to Fifth aspects, wherein a powder or a welding material is used as a raw material for the simultaneous irradiation system.

Seventh aspect: The method according to the Sixth aspect, wherein the powder is sprayed onto a focused light beam of the irradiation, or
the welding material is supplied to reach the focused light beam.

Eighth aspect: The method according to the Sixth or Seventh aspect, wherein a metal wire is used as the welding material.

Ninth aspect: The method according to the Fifth aspect, wherein the after irradiation system for the formation of the peripheral solidified portion corresponding to the side surface portion is performed prior to the performance of the simultaneous irradiation system for the formation of the internal solidified portion.

Tenth aspect: The method according to the Ninth aspect, wherein a residual powder of the powder layer, which is left due to no use for the formation of the peripheral solidified portion corresponding to the side surface portion, is sucked to be removed at a point in time after the performance of the after irradiation system for the formation of the peripheral solidified portion corresponding to the side surface portion, and also before the performance of the simultaneous irradiation system for the formation of the internal solidified portion.

Eleventh aspect: The method according to any one of the First to Tenth aspects, wherein, in a case where the three-dimensional shaped object to be manufactured has a hollow portion, a wall solidified portion made of the solidified layer is formed by the after irradiation system, the wall solidified portion corresponding to a wall for the hollow portion of the three-dimensional shaped object.

Twelfth aspect: The method according to any one of the First to Eleventh aspects, wherein the powder layer for the after irradiation system and the raw material for the simultaneous irradiation system are different from each other in terms of kind of material.

Thirteenth aspect: The method according to the Ninth aspect, wherein the after irradiation system is performed such that a surface of the peripheral solidified portion corresponding to the side surface portion has a stepped form, the surface corresponding to an interface between the internal solidified portion and the peripheral solidified portion corresponding to the side surface portion.

INDUSTRIAL APPLICABILITY

The method for manufacturing a three-dimensional shaped object according to present invention can produce various kinds of objects. For example in a case where the powder layer is a metal powder layer (inorganic powder layer) and thus the solidified layer corresponds to a sintered layer, the produced three-dimensional shaped object can be used as a metal mold for a plastic injection molding, a press molding, a die casting, a casting or a forging. While on the other hand in a case where powder layer is a resin powder layer (organic powder layer) and thus the solidified layer corresponds to a cured layer, the produced three-dimensional shaped object can be used as a resin molded article.

CROSS REFERENCE TO RELATED PATENT APPLICATION

The present application claims the right of priority of Japanese Patent Application No. 2015-152061 (filed on Jul. 31, 2015, the title of the invention: "METHOD FOR MANUFACTURING THREE-DIMENSIONAL SHAPED OBJECT"), the disclosure of which is all incorporated herein by reference.

Although some embodiments of the present invention have been hereinbefore described, such embodiments are only for illustrative purpose showing typical examples, and thus the present invention is not limited to these embodiments. It will be readily appreciated by those skilled in the art that various modifications are possible without departing from the scope of the invention.

EXPLANATION OF REFERENCE NUMERALS

22 Powder layer
24 Solidified layer
50 After irradiation system
60 Simultaneous irradiation system
64 Powder used in simultaneous irradiation system
66 Welding material used in simultaneous irradiation system
100 Three-dimensional shaped object
110 Peripheral solidified portion corresponding to periphery of three-dimensional shaped object
110A Side surface portion of three-dimensional shaped object
110B Top surface portion of three-dimensional shaped object
120 Internal solidified portion corresponding to portion other than periphery of three-dimensional shaped object
150 Hollow portion
170 Wall solidified portion for hollow portion
L Light beam

The invention claimed is:

1. A method for manufacturing a three-dimensional shaped object by a successive formation of a plurality of solidified layers through light beam irradiation, the method comprising:
    forming the solidified layers by a hybrid of combined systems that includes an after-irradiation system and a simultaneous-irradiation system,
    performing light beam irradiation by the after-irradiation system after a formation of a powder layer, and
    performing light beam irradiation by the simultaneous-irradiation system while a raw material is supplied,
    the after-irradiation system being operated to form a peripheral solidified portion corresponding to a periphery of the three-dimensional shaped object, and
    the simultaneous-irradiation system being operated to form an internal solidified portion corresponding to an internal region of the three-dimensional shaped object located inside the periphery of the three-dimensional shaped object.

2. The method according to claim 1, wherein a thickness of one of the plurality of solidified layers formed by the simultaneous-irradiation system is larger than a thickness of another of the plurality of solidified layers formed by the after-irradiation system.

3. The method according to claim 1, wherein a spot diameter of the light beam irradiation performed by the simultaneous-irradiation system is larger than a spot diameter of the light beam irradiation performed by the after-irradiation system.

4. The method according to claim 1, wherein the periphery is at least one of a side surface portion and a top surface portion of the three-dimensional shaped object.

5. The method according to claim 1, wherein a powder or a welding material is used as the raw material for the simultaneous-irradiation system.

6. The method according to claim 5, wherein the powder is sprayed onto a focused light beam of the irradiation, or the welding material is suppled to reach the focused light beam.

7. The method according to claim 5, wherein a metal wire is used as the welding material.

8. The method according to claim 4, wherein the after-irradiation system is operated to form the peripheral solidified portion before the simultaneous-irradiation system is operated to form the internal solidified portion.

9. The method according to claim 8, wherein a residual powder of the powder layer, which has not been used to form the peripheral solidified portion, is removed by suction at a point in time after the operation of the after-irradiation system to form the peripheral solidified portion corresponding to the side surface portion and before the operation of the simultaneous-irradiation system to form the internal solidified portion.

10. The method according to claim 1, wherein, in a case where the three-dimensional shaped object to be manufactured has a hollow portion, a wall solidified portion made of one of the plurality of solidified layers is formed by the after-irradiation system, wherein the wall solidified portion corresponds to a wall for the hollow portion of the three-dimensional shaped object.

11. The method according to claim 1, wherein the powder layer for the after-irradiation system and the raw material for the simultaneous-irradiation system are different from each other in terms of kind of material.

12. The method according to claim 8, wherein the after-irradiation system is operated such that a surface of the peripheral solidified portion corresponding to the side surface portion has a stepped form, wherein the surface of the peripheral solidified portion corresponds to an interface between the internal solidified portion and the peripheral solidified portion corresponding to the side surface portion.

* * * * *